US 6,602,594 B2

(12) United States Patent
Miyata et al.

(10) Patent No.: US 6,602,594 B2
(45) Date of Patent: Aug. 5, 2003

(54) IRREVERSIBLE HEAT-SENSITIVE COMPOSITION

(75) Inventors: Sachie Miyata, Kawagoe (JP); Hiromichi Mizusawa, Hannou (JP); Daisuke Harumoto, Sakado (JP)

(73) Assignee: Nichiyu Giken Kogyo Co., Ltd. (JP)

( * ) Notice: Subject to any disclaimer, the term of this patent is extended or adjusted under 35 U.S.C. 154(b) by 122 days.

(21) Appl. No.: 09/839,265

(22) Filed: Apr. 23, 2001

(65) Prior Publication Data

US 2001/0044014 A1 Nov. 22, 2001

(30) Foreign Application Priority Data

| Apr. 25, 2000 | (JP) | 2000-124431 |
| Jan. 29, 2001 | (JP) | 2001-020557 |
| Jan. 29, 2001 | (JP) | 2001-020558 |

(51) Int. Cl.$^7$ .............. B41M 5/30; B41M 5/36
(52) U.S. Cl. ........... 428/323; 106/31.29; 106/31.33; 428/206; 428/207; 428/321.3; 428/913
(58) Field of Search .............. 428/195, 207, 428/484, 488.1, 913, 914, 206, 323, 321.3; 106/31.13, 31.27, 31.29, 31.33

(56) References Cited

U.S. PATENT DOCUMENTS

| 4,050,945 A | 9/1977 | Suzuki | 106/21 |
| 4,756,758 A | 7/1988 | Lent et al. | 106/22 |
| 4,797,243 A * | 1/1989 | Wolbrom | 264/126 |
| 4,931,420 A | 6/1990 | Asano et al. | 503/205 |

FOREIGN PATENT DOCUMENTS

| WO | WO 98/02314 | * | 1/1998 |

* cited by examiner

Primary Examiner—B. Hamilton Hess
(74) Attorney, Agent, or Firm—Parkhurst & Wendel, L.L.P.

(57) ABSTRACT

An irreversible heat-sensitive composition comprises a mixture of a granular or powdery heat-fusible substance having a melting point corresponding to a temperature to be recorded and a granular or powdery dyestuff diffusible into the fused heat-fusible substance through dispersion or dissolution. A heat-sensitive ink comprises the irreversible heat-sensitive composition and an ink vehicle capable of diffusing the fused heat-fusible substance therein. A heat-sensitive ink according to another embodiment comprises microcapsules, which encapsulate the irreversible heat-sensitive composition. A heat-sensitive indicator comprises a substrate provided thereon with a printed heat-sensitive ink, the heat-sensitive ink being one of these heat-sensitive inks.

12 Claims, No Drawings

IRREVERSIBLE HEAT-SENSITIVE COMPOSITION

BACKGROUND OF THE INVENTION

The present invention relates to a heat-sensitive ink comprising a heat-sensitive composition, which can undergo an irreversible color tone change at a predetermined temperature to thus permit the recording of whether a specific substance is exposed to a temperature higher than a predetermined level or not, as well as a heat-sensitive indicator using the same.

There have been known products, for instance, processed food products, which should be heat-treated at a temperature higher than a specific level during the manufacture of the same. There have also been known some products or articles such as products for medical use and food products, which are deteriorated, decomposed and/or putrefied, if they are exposed to a temperature higher than a specific one. In addition, there have likewise been known such products as electric equipments and electric parts, which get out of order, are broken and/or possibly cause a fire due to overheat in case of, for instance, a motor.

As a means for detecting whether a particular product experiences or is exposed to a temperature exceeding a predetermined level or not, there have conventionally been used, for instance, temperature-indicating materials capable of changing their color tone upon exposure thereof to such a predetermined temperature.

As such temperature-indicating materials, there have been known those comprising heat-fusible substances and acid-base indicators, specific examples of which are disclosed in, for instance, Japanese Patent Provisional Publication No. Sho 61-12783 and Japanese Patent Provisional Publication No. Sho 61-14284. The temperature-indicating materials of this type are reversible temperature indicators since they undergo color change upon heating and the color tone thereof is returned back to the original one when they are cooled. If a temperature-indication material of this type is used, whether a product is exposed to a temperature exceeding a predetermined level or not can be confirmed by monitoring the color tone change of the material during heating. However, if the color tone change of such a material is not monitored, it is impossible to confirm if a product experiences a temperature exceeding a predetermined level once the time elapses and the temperature of the product is reduced. Moreover, it is also impossible to record and preserve such a temperature history of the product.

In addition, Japanese Patent Provisional Publication No. Hei 10-239172 discloses a device for monitoring the upper temperature limit, which comprises a thin film of pigmented solid paraffin and a thin solid paraffin film having the same quality and deposited on the former. This device is one prepared by forming a thin film of paraffin previously pigmented and then depositing a thin film of non-pigmented paraffin on the surface of the former and should have a predetermined shape. This device is designed in such a manner that, when the device is exposed to a temperature exceeding a predetermined one, the fused upper layer or non-pigmented paraffin thin film is admixed with the lower layer or the pigmented paraffin thin film likewise in the fused state to thus develop a color tone apparently different from that observed prior to the fusion.

Moreover, Japanese Utility Model Application Publication No. Sho 46-28235 discloses an irreversible label. This label should be produced as a three-dimensional structure and therefore, the application thereof is quite limited.

SUMMARY OF THE INVENTION

Accordingly, it is a first object of the present invention to provide a heat-sensitive composition, which undergoes an irreversible color change responding to a temperature change, which permits the use of a wide variety of dyestuffs, which can be used in printing irrespective of the shape of a target to be printed, which can be mass-produced and permits the reduction of the production cost thereof and which allows the systematization of temperatures for indication or detection.

The irreversible heat-sensitive composition according to the present invention developed to achieve the first object of the present invention comprises a mixture of a granular (or granular) or powdery heat-fusible substance having a melting point corresponding to a temperature to be recorded and a granular or powdery dyestuff diffusible into the fused heat-fusible substance through dispersion or dissolution.

It is a second object of the present invention to provide a heat-sensitive ink, which can indicate, with high precision, whether it is exposed to a temperature exceeding a predetermined level or it has a desired temperature history or not, through a clear color tone change.

The heat-sensitive ink according to the present invention developed to accomplish the second object of the present invention comprises the foregoing irreversible heat-sensitive composition and an ink vehicle capable of diffusing the fused heat-fusible substance therein.

According to another embodiment of the heat-sensitive ink of the present invention comprises microcapsules in which the foregoing irreversible heat-sensitive composition is enclosed or encapsulated.

It is a third object of the present invention to provide a heat-sensitive indicator, which can indicate, with high precision, whether it is exposed to a temperature exceeding a predetermined level or it has a desired temperature history or not, through a clear color tone change which the color change itself could be preserved, and could easily be mass-produced.

The heat-sensitive indicator according to the present invention developed to achieve the third object of the invention comprises a substrate, which the foregoing heat-sensitive ink is printed on.

DETAILED EXPLANATION OF THE INVENTION

The irreversible heat-sensitive composition according to the present invention comprises a mixture of a granular or powdery heat-fusible substance with a granular or powdery dyestuff.

The irreversible heat-sensitive composition preferably comprises 0.001 to 100 parts by weight of the granular or powdery dyestuff per 100 parts by weight of the granular or powdery heat-fusible substance.

The heat-fusible substance is a component, which determines the color change-temperature of the irreversible heat-sensitive composition and a substance, which has, under ordinary pressure, a melting point corresponding to the temperature to be recorded and which can be fused when heated to a temperature higher than the melting point and undergo a change in state from a granular or powdery state to a liquid state. The heat-fusible substance suitably used herein is at least one member selected from the group consisting of fatty acid derivatives, alcohol derivatives, ether derivatives, aldehyde derivatives, ketone derivatives, amine derivatives, amide derivatives, nitrile derivatives, hydrocarbon derivatives, thiol derivatives and sulfide derivatives.

Specific examples of fatty acid derivatives are myristic acid, palmitic acid, adipic acid, octanoic acid, tricosanoic acid, tetratriacontanoic acid, 2,3-dimethyl nonanoic acid, 23-methyl tetracosanoic acid, 2-hexenoic acid, brassidic acid, 2-methyl-2-dodecenoic acid, β-eleostearic acid, behenolic acid, cis-9,10-methylene octadecanoic acid, chaulmoogric acid, n-dodecyl 3,3'-thiodipropionate, trilaurin, palmitic acid anilide, stearic acid amide, zinc stearate, salicylic acid anilide, N-acetyl-L-glutamic acid, caproic acid-β-naphthylamide, enanthic acid phenylhydrazide, p-chlorophenacyl arachionate, cholesteryll formate, 1-aceto-2,3-distearin, pentadecyl thiolaurate, stearic acid chloride, palmitic acid anhydride, stearic acid-acetic acid anhydride, succinic acid, sebacic acid benzyl ammonium salt, 2-bromovaleric acid, methyl α-sulfostearic acid sodium salt, and 2-fluoroarachic acid.

Specific examples of alcohol derivatives are octadecyl alcohol, cholesterin, D-mannitol, galactitol, heptatriacontanol, hexadecan-2-ol, 1-trans-2-octadecenol, β-eleostearyl alcohol, cycloeicosanol, d(+)cellobiose, p,p'-biphenol, riboflavin, 4-chloro-2-methylphenol and 2-bromo-1-indanol.

Specific examples of ether derivatives include dihexadecyl ether, dioctadecyl ether, cytidine, adenosine, sodium phenoxyacetate, 1,3-bis (4-hydroxyphenoxy)-benzene and aluminium triethoxide.

Specific examples of aldehyde derivatives are stearin aldehyde, paralauryl aldehyde, parastearin aldehyde, naphthoaldehyde, p-chlorobenzaldehyde, phthalaldehyde and 4-nitrobenzaldehyde.

Specific examples of ketone derivatives are stearone, docoson-2-one, phenyl heptadecyl ketone, cyclononadecane, vinyl heptadecyl ketone, 4,4-bisdimethyl aminobenzophenone, bis (2,4-pentanedionite) calcium and 1-chloroanthraquinone.

Specific examples of amine derivatives include tricosylamine, dioctadecylamine, N,N-dimethyl octylamine, heptadecamethyleneimine, naphthylamine, ethyl p-aminobenzoate, o-trithiourea, sulfamethazine, guanidine nitrate, p-chloroaniline and propylamine hydrochloride.

Specific examples of amide derivatives are hexylamide, octacosylamide, N-methyl dodecylamide, N-methyl heptacosylamide, α-cyanoacetamide, salicylamide, dicyandiamide, 2-nitrobenzamide and N-bromoacetamide.

Specific examples of nitrile derivatives include pentadecane nitrile, margaronitrile, 2-naphthonitrile, o-nitrophenoxy acetic acid, 3-bromobenzonitrile, 3-cyanopyridine and 4-cyanophenol.

Specific examples of hydrocarbon derivatives are hexadecane, 1-nonatriacontene, trans-n-2-octadecene, hexatriacontyl benzene, 2-methylnaphthalene, picene, cyanuric chloride, 1-fluorononadecane, 1-chloroeicosane, 1-iodopentadecane, 1-bromoheptadecane and 1,2,4,5-tetrakis (bromomethyl) benzene.

Specific examples of thiol derivatives are pentadecane thiol, eicosane thiol, 2-naphthalene thiol, 2-mercaptoethyl ether and 2-nitrobenzene sulfenyl chloride.

Specific examples of sulfide derivatives are 1,3-diatine, 2,11-dithia [3,3] paracyclophane, bis (4-hydroxy-3-methylphenyl) sulfide, 4,4-dipyridyl sulfide and 4-methyl mercaptophenol.

This heat-fusible substance preferably has a particle size ranging from 0.01 $\mu$m to 5 mm.

The dyestuff is included in the irreversible heat-sensitive composition in the form of granules or powder and can diffuse into the fused heat-fusible substance through dispersion or dissolution. Alternatively, the dyestuff may likewise be one such that the surface of the dyestuff granule or powder is wetted with the fused heat-fusible substance and changed to a wet color. The dyestuff may be selected from wide variety of dyestuffs, for instance, dyes such as direct dyes, acid dyes, basic dyes, disperse dyes, reactive dyestuffs, oil-soluble dyes, vat dyes, mordant dyes, azo dyes and sulfide dyes; pigments such as organic pigments and inorganic pigments; and pigmented substances. These dyestuffs may be used alone or in any combination of at least two of them.

Specific examples of dyes include C.I. Direct Orange 39, C.I. Direct Brown 2, C.I. Acid Yellow 73, C.I. Acid Red 52, C.I. Acid Violet 49, C.I. Basic Yellow 11, C.I. Basic Red 38, Cathilon Red GTLH, Cathilon Red 4GH, Cathilon Red 7BN11 and Cathilon Red SGLH (available from Hodogaya Chemical Co., Ltd.); C.I. Mordant Red 7, C.I. Mordant Black 38, C.I. Azoic Blue 9, C.I. Azoic Diazo Component 11, C.I. Sulfur Black 1, C.I. Sulfur Red 5, C.I. Vat Green 9, C.I. Vat Violet 2, C.I. Disperse Blue 3 and Discharge Red BB (available from Mitsui Toatsu Dyes Co., Ltd.); C.I. Reactive Blue 19, C.I. Reactive Blue 15 and Remazol Br Blue R-KN (available from Mitsubishi Chemical Industries, Ltd.); C.I. Solvent Orange 2, C.I. Solvent Blue 25, C.I. Acid Green 1, Flavianic Acid Disodium Salt and Primuline Sulfonic Acid.

Specific examples of organic pigments are 4,10-dibromoanthanthrone, dibenzoanthrone, cochineal lake, C.I. Pigment Yellow 1, C.I. Pigment Red 38, C.I. Pigment Blue 15, C.I. Pigment Red 209, C.I. Pigment Yellow 109, C.I. Pigment Green 10, C.I. Basic Red 1-Lake, C.I. Acid Red 87-Lake, C.I. Pigment Blue 6, C.I. Pigment Red 179, C.I. Pigment Red 88, Alizarin Lake, C.I. Pigment Violet 23, C.I. Pigment Green 8, C.I. Pigment Red 53, C.I. Pigment Yellow 23-Lake, tannic acid-gallic acid-iron lake, C.I. Pigment Yellow 34 and C.I. Pigment Yellow 35. In this connection, the foregoing term "C.I." is an abbreviation of "color index".

Specific examples of inorganic pigments are kaolin, Prussian blue, strontium sulfate, titanium dioxide, aluminum hydroxide, calcium silicate and carbon black.

The dyestuff preferably has a particle size ranging from 0.001 $\mu$m to 5 mm.

In the irreversible heat-sensitive composition, the granular or powdery heat-fusible substance and the granular or powdery dyestuff are in a mixed state, the dyestuff is covered up with the heat-fusible substance and the granular or powdery heat-fusible substance is fused, while the granular or powdery dyestuff is dispersed or dissolved in or wetted with the fused heat-fusible substance to thus cause a color tone change when the temperature reaches or exceeds a desired level. After the color tone change, it is never returned back to the original color tone even if the composition is cooled and the heat-fusible substance is solidified.

To obtain this irreversible heat-sensitive composition, a heat-fusible substance and a dyestuff are mixed together in a desired mixing ratio, followed by pulverization of the resulting mixture to a desired particle size; or the foregoing two components are separately pulverized to a desired particle size and then the pulverized components are mixed together in a desired mixing ratio.

The heat-sensitive ink according to the present invention comprises the foregoing irreversible heat-sensitive composition comprising a mixture of a granular or powdery heat-fusible substance having a melting point corresponding to a temperature to be recorded and a granular or powdery dyestuff diffusible into the fused heat-fusible substance through dispersion or dissolution; and an ink vehicle capable of diffusing the fused heat-fusible substance therein.

The ink vehicle does not permit any dissolution or diffusion of the heat-fusible substance and the dyestuff at ordinary temperature, but permits the diffusion of the fused substance in which the dyestuff is dispersed or dissolved. The ink vehicle may be, for instance, acrylic resins, phenol resins, nylon, ethyl cellulose, hydroxymethyl cellulose, polyvinyl alcohol and carboxymethyl cellulose. The ink vehicle may likewise be any commercially available ink vehicles such as PAS800 Medium (the trade name of a product available from Jujo Chemical Industry Co., Ltd.) and High Set Mat Medium (the trade name of a product available from Mino Group K.K.).

It is preferred that the heat-fusible substance be included in the heat-sensitive ink in an amount ranging from 10 to 70% by weight. This is because if the amount thereof is less than 10% by weight, the resulting color tone change is insufficient or indistinct, while if it exceeds 70% by weight, the adhesive force of the resulting ink is too low to coat or print a substrate with the ink.

This heat-sensitive ink may comprise a solvent, which does not dissolve the heat-fusible substance and the dyestuff, but can dissolve the ink vehicle. Such a solvent may be, for instance, water, ethanol, butanol, ethyl acetate, isoamyl acetate, methyl ethyl ketone, methyl isobutyl ketone, xylene, diethyl benzene, toluene, butyl cellosolve, ethyl cellosolve and mineral spirit.

This heat-sensitive ink can be prepared by uniformly kneading, in a kneader, the foregoing heat-fusible substance and dyestuff, which are pulverized to a desired particle size, an ink vehicle and a solvent.

According to another embodiment of the heat-sensitive ink of the present invention may comprise microcapsules each of which encloses the foregoing irreversible heat-sensitive composition comprising a mixture of a granular or powdery heat-fusible substance having a melting point corresponding to a temperature to be recorded and a granular or powdery dyestuff diffusible into the fused heat-fusible substance through dispersion or dissolution. The microcapsules are unevenly distributed in the resulting ink.

The microcapsule is, for instance, a minute particle having a uniform outer wall and having a size ranging from about 0.01 $\mu$m to about 10 mm, which encloses the granular or powdery dyestuff and heat-fusible substance.

In the present invention, it is preferred that the outer wall of the microcapsule be formed from a polymer compound selected from the group consisting of polyvinyl alcohol, polystyrene, silicone resins, epoxy resins, acrylic resins, urea resins, gelatin, methyl cellulose, polyurethane, waxes, gum arabic, dextrin, and nylon.

Such microcapsules are, for instance, prepared by an interfacial polymerization method, an in-situ production method, a phase separation method, a suspension-in air method, an electrostatic coalescence method, a spray coagulation method and a drying-in liquid method.

The microcapsules are preferably contained in the heat-sensitive ink in an amount ranging from 10 to 70% by weight. This is because if the amount thereof is less than 10% by weight, the color tone change of the resulting ink is insufficient or indistinct, while if it exceeds 70% by weight, the adhesive force of the resulting ink is too low to coat or print a substrate with the ink.

The use of the microcapsules permits the improvement of not only the stability of the heat-fusible substance and the dyestuff present in the ink, but also the environmental resistance of the ink. Moreover, in the preparation of the ink, vehicles and solvents to be incorporated into the ink are not restricted to those, which do not dissolve the heat-fusible substance and the dyestuff and the resulting ink is excellent in the printability and the storage stability after printing.

The heat-sensitive ink preferably comprises an ink vehicle identical to those described above. The ink vehicle may be commercially available ones other than those listed above such as Aqua Set Ink (the trade name of a product available from Jujo Chemical industry Co., Ltd.), VAR-000 Medium (the trade name of a product available from Teikoku Ink K.K.) and Ramistar R Medium (the trade name of a product available from Toyo Ink Mfg. Co., Ltd.).

This heat-sensitive ink may comprise a solvent capable of dissolving the ink vehicle. This solvent may be isopropyl alcohol in addition to those listed above.

This heat-sensitive ink can preferably be prepared as follows: First, microcapsules are prepared according to the interfacial polymerization method. More specifically, a heat-fusible substance and a dyestuff are dispersed or emulsified in a solvent which does not dissolve the heat-fusible substance and the dyestuff, but can dissolve a polymeric compound for forming the outer wall of the microcapsules using a device such as a stirring machine, a disperser, a homogenizer or a mixer. Then an emulsifying-hardening agent is added to the resulting dispersion to thus form the outer wall of the microcapsules and thereafter the resulting microcapsules are separated from the solvent by, for instance, filtration to thus give desired microcapsules in which the heat-fusible substance and the dyestuff are enclosed. Finally, an ink vehicle, a solvent for ink vehicle and the resulting microcapsules are kneaded in a kneader to give a heat-sensitive ink.

In this respect, the heat-sensitive ink may further comprise a dispersant for improving the dispersibility of the dyestuff and for making the color tone change of the ink more distinct, such as talc, magnesium carbonate and silica. In order to make the color tone change more distinct, the heat-sensitive ink may optionally comprise at least one member selected from the group consisting of dyes such as direct dyes, acid dyes, basic dyes, disperse dyes, reactive dyestuffs, oil-soluble dyes, vat dyes, mordant dyes, azo dyes and sulfide dyes; pigments such as organic pigments and inorganic pigments, which are auxiliary coloring agents showing colors contrast to the color tone of the dyestuff. Moreover, the heat-sensitive ink may likewise comprise a wax and/or a surfactant for controlling the flowability and the drying characteristics of the ink.

The heat-sensitive indicator according to the present invention comprises a substrate and a printed layer of the foregoing heat-sensitive ink, which is applied onto the surface of the substrate and comprises an irreversible heat-sensitive composition, which is a mixture of a granular or powdery heat-fusible substance having a melting point corresponding to a temperature to be recorded and a granular or powdery dyestuff diffusible into the fused heat-fusible substance through dispersion or dissolution, and an ink vehicle capable of diffusing the fused heat-fusible substance therein.

According to another embodiment of the present invention, the heat-sensitive indicator comprises a substrate and a printed layer of the foregoing heat-sensitive ink, which is applied onto the surface of the substrate and comprises microcapsules each of which encloses the irreversible heat-sensitive composition comprising a mixture of a granular or powdery heat-fusible substance having a melting point corresponding to a temperature to be recorded and a granular or powdery dyestuff diffusible into the fused heat-fusible substance through dispersion or dissolution.

Examples of such substrates are paper such as plain paper, Japan art paper and Kent paper; synthetic paper; wood such as sun tree timber; and plastic substrates such as polypropylene, polyethylene terephthalate, acrylonitrile-butadiene-styrene resin, polycarbonate and acrylic resin substrates.

These heat-sensitive indicators may be in the form of a card-like, sheet-like or rod-like shape. Alternatively, they may be labels, which carry an adhesive layer on the back face.

The printing of the substrate with the heat-sensitive ink is performed by, for instance, screen-printing, offset printing, gravure printing and brush coating techniques.

The ink layers formed on the substrate by printing with these heat-sensitive inks may be covered up with a transparent or translucent laminate material made of a resin. Examples of such laminate materials are plastic films such as polypropylene, polyethylene terephthalate, acrylonitrile-butadiene-styrene resin, polycarbonate and acrylic resin films; and printing mediums for laminate such as acrylic resins, nylon and phenol resin.

In these heat-sensitive indicators, the heat-fusible substance and the dyestuff are in a mixed state, prior to heating. If the indicator is heated to a temperature higher than the melting point of the heat-fusible substance, however, the dyestuff diffuses into the fused heat-fusible substance through dispersion or dissolution or the surface of the granular or powdery dyestuff is wetted with the fused heat-fusible substance so that the indicator undergoes a desired color tone change. Alternatively, in case of the indicator, which makes use of microcapsules, the heat-fusible substance and the dyestuff enclosed in the microcapsules may be permeated through the outer wall of the microcapsules and diffuse into the ink vehicle, after the fusion of the heat-fusible substance by heating.

This diffusion of the foregoing components is irreversible. Therefore, once the indicator undergoes a desired color tone change, the color tone thereof is never returned back to the original one even if the heat-fusible substance is cooled, after the color tone change, and solidified.

When practically using these heat-sensitive indicators, they are arranged near the product of which temperature history is to be detected or they are adhered to such a product. Alternatively, it is also possible to directly print such a product with the heat-sensitive ink.

EXAMPLES

The irreversible heat-sensitive composition, the heat-sensitive ink containing the composition and the heat-sensitive indicator using the ink thereof according to the present invention will hereunder be described in more detail with reference to the following Examples.

In the following Examples 1 to 121, there are embodied the preparation of the irreversible heat-sensitive compositions according to the present invention, while in the following Comparative Examples 1 to 6, there are embodied compositions, which are beyond the scope of the present invention.

Examples 1 to 121

A heat-fusible substance was blended with 0.001 to 100 parts by weight of a dyestuff, which underwent a color tone change when it is dissolved or dispersed in or wetted with the heat-fusible substance after the fusion thereof, per 100 parts by weight of the former and then the resulting blend was pulverized, using a mortar and a pestle, to such an extent that the particle size of the heat-fusible substance fell within the range of 0.01 μm to 5 mm and that the particle size of the dyestuff fell within the range of 0.001 μm to 5 mm to thus give each corresponding composition. Each prepared composition was heated till it was fused and then the fused composition was cooled till re-solidified to thus confirm any color tone change of the composition. The kinds and amounts of part by weight, color tone before and after the color change and the melting temperature of the heat-fusible substances and dyestuffs are summarized in the following Tables 1 to 4.

TABLE 1

(Examples 1 to 30)

| Ex. | Heat-fusible Substance | Amount | Dyestuff | Amount | Before heating | After re-solidification | Indicating Point (° C.) |
|---|---|---|---|---|---|---|---|
| 1 | Myristic acid | 100 | Acid Yellow 73 | 0.1 | White | Yellow | 50 |
| 2 | Palmitic acid | 100 | Basic Yellow 11 | 0.1 | White | Yellow | 60 |
| 3 | Adipic acid | 100 | Basic Red 38 | 1 | White | Red | 150 |
| 4 | Octanoic acid | 100 | Pigment Yellow23-Lake | 100 | White | Yellow | 17 |
| 5 | Tricosanoic acid | 100 | Pigment Blue 15 | 50 | White | Blue | 79 |
| 6 | Tetratriacontanoic acid | 100 | Pigment Yellow 34 | 50 | White | Yellow | 98 |
| 7 | 2,3-Dimethyl-nonanoic acid | 100 | Carbon Black | 10 | White | Black | 122 |
| 8 | 23-Methyl-tetracosanoic acid | 100 | Direct Orange 39 | 0.001 | White | Orange | 83 |
| 9 | 2-Hexenoic acid | 100 | Mordant Red 7 | 1 | White | Red | 32 |
| 10 | Brassidic acid | 100 | Azoic Blue 9 | 1 | White | Blue | 62 |
| 11 | 2-Methyl-2- | 100 | Vat Green 9 | 0.1 | White | Green | 33 |

TABLE 1-continued (Examples 1 to 30)

| Ex. | Heat-fusible Substance | Amount | Dyestuff | Amount | Before heating | After re-solid-ification | Indicating Point (° C.) |
|---|---|---|---|---|---|---|---|
| | dodecenoic acid | | | | | | |
| 12 | β-Eleostearic acid | 100 | Mordant Black 38 | 1 | White | Black | 72 |
| 13 | Behenolic acid | 100 | Sulfur Black 1 | 0.01 | White | Black | 58 |
| 14 | cis-9,10-Methylene-octadecanoic acid | 100 | Solvent Blue 25 | 1 | White | Blue | 87 |
| 15 | Chaulmoogric acid | 100 | Cathilon Red SGLH | 0.01 | White | Red | 69 |
| 16 | n-Dodecyl 3,3'-thiodipropionate | 100 | Direct Brown 2 | 1 | White | Brown | 40 |
| 17 | Trilaurin | 100 | Sulfur Red 5 | 0.1 | White | Red | 45 |
| 18 | Palmitic acid anilide | 100 | Reactive Blue 19 | 1 | White | Blue | 85 |
| 19 | Stearic acid amide | 100 | Basic Red 38 | 1 | White | Red | 90 |
| 20 | Zinc stearate | 100 | Acid Yellow 73 | 0.1 | White | Yellow | 110 |
| 21 | Salicylic acid anilide | 100 | Disperse Blue 3 | 1 | White | Blue | 130 |
| 22 | N-Acetyl-L-glutamic acid | 100 | Vat Violet 2 | 0.1 | White | Purple | 190 |
| 23 | Caproic acid-β-naphthyl-amide | 100 | Reactive Blue 15 | 1 | White | Blue | 107 |
| 24 | Enanthic acid phenylhydrazide | 100 | Solvent Orange 2 | 0.001 | White | Orange | 103 |
| 25 | p-Chlorophenacyl arachionate | 100 | Azoic Diazo Component 11 | 0.1 | White | Red | 86 |
| 26 | Cholesteryl formate | 100 | Remazol Brilliant Blue R-KN | 0.1 | White | Blue | 96 |
| 27 | 1-Aceto-2,3-distearin | 100 | 4,10-Dibromo-anthanthrone | 1 | White | Red | 57 |
| 28 | Pentadecyl thiolaurate | 100 | Dibenzo-anthrone | 10 | White | Black | 52 |
| 29 | Stearic acid chloride | 100 | Cochineal lake | 10 | White | Red | 23 |
| 30 | Palmitic acid anhydride | 100 | Pigment Yellow 1 | 100 | White | Yellow | 64 |

TABLE 2

(Examples 31 to 60)

| Ex. | Heat-fusible Substance | Amount | Dyestuff | Amount | Before heating | After re-solid-ification | Indicating Point (° C.) |
|---|---|---|---|---|---|---|---|
| 31 | Stearic acid-acetic acid anhyride | 100 | Mordant Red 7 | 1 | White | Red | 54 |
| 32 | Succinic acid | 100 | Direct Orange 39 | 0.1 | White | Orange | 185 |
| 33 | Sebacic acid benzyl ammonium salt | 100 | Acid Red 52 | 0.01 | White | Red | 122 |
| 34 | 2-Bromovaleric acid | 100 | Pigment Red 209 | 50 | White | Red | 67 |
| 35 | Methyl α-sulfostearic acid sodium salt | 100 | Basic Yellow 11 | 0.1 | White | Yellow | 180 |
| 36 | 2-Fluoroarachic acid | 100 | Azoic Blue 9 | 1 | White | Blue | 90 |
| 37 | Octadecyl alcohol | 100 | Primuline Sulfonic Acid | 1 | White | Yellow | 55 |

TABLE 2-continued (Examples 31 to 60)

| Ex. | Heat-fusible Substance | Amount | Dyestuff | Amount | Before heating | After re-solid-ification | Indicating Point (° C.) |
|---|---|---|---|---|---|---|---|
| 38 | Cholesterin | 100 | Pigment Red 38 | 50 | White | Red | 140 |
| 39 | D-mannitol | 100 | Basic Red 1-Lake | 50 | White | Red | 165 |
| 40 | Galactitol | 100 | Reactive Blue 15 | 1 | White | Blue | 185 |
| 41 | Heptatriacontanol | 100 | Disperse Blue 3 | 1 | White | Blue | 91 |
| 42 | Hexadecan-2-ol | 100 | Basic Yellow 11 | 0.1 | White | Yellow | 44 |
| 43 | 1-trans-2-Octadecenol | 100 | Pigment Yellow 109 | 100 | White | Yellow | 48 |
| 44 | β-Eleostearyl alcohol | 100 | Cathilon Red SGLH | 0.01 | White | Red | 59 |
| 45 | Cycloeicosanol | 100 | Azoic Diazo Component 11 | 0.1 | White | Red | 69 |
| 46 | d(+)Cellobiose | 100 | Pigment Blue 15 | 50 | White | Blue | 180 |
| 47 | p,p'-Biphenol | 100 | Basic Yellow 11 | 0.1 | White | Yellow | 280 |
| 48 | Riboflavin | 100 | Solvent Blue 25 | 1 | White | Blue | 320 |
| 49 | 4-Chloro-2-methylphenol | 100 | Acid Red 87-Lake | 10 | White | Red | 47 |
| 50 | 2-Bromo-1-indanol | 100 | Acid Red 52 | 0.01 | White | Red | 131 |
| 51 | Dihexadecyl ether | 100 | Pigment Blue 6 | 50 | White | Blue | 54 |
| 52 | Dioctadecyl ether | 100 | Dibenzoanthrone | 10 | White | Black | 59 |
| 53 | Cytidine | 100 | Solvent Orange 2 | 0.01 | White | Orange | 210 |
| 54 | Adenosine | 100 | Sulfur Black 1 | 0.01 | White | Black | 220 |
| 55 | Sodium phenoxy-Acetate | 100 | Pigment Green 10 | 50 | White | Green | 240 |
| 56 | 1,3-Bis(4-hydroxyphenoxy)-benzene | 100 | Acid Yellow 73 | 0.1 | White | Yellow | 130 |
| 57 | Aluminium triethoxide | 100 | Pigment Red 88 | 50 | White | Red | 159 |
| 58 | Stearin aldehyde | 100 | Sulfur Red 5 | 0.1 | White | Red | 38 |
| 59 | Paralauryl-aldehyde | 100 | Pigment Red 179 | 50 | White | Red | 57 |
| 60 | Parastearin-aldehyde | 100 | Mordant Red 7 | 1 | White | Red | 78 |

TABLE 3

(Examples 61 to 90)

| Ex. | Heat-fusible Substance | Amount | Dyestuff | Amount | Before heating | After re-solid-ification | Indicating Point (° C.) |
|---|---|---|---|---|---|---|---|
| 61 | Naphtho-aldehyde | 100 | Sulfur Black 1 | 0.01 | White | Black | 61 |
| 62 | p-Chlorobenz-aldehyde | 100 | Vat Violet 2 | 0.1 | White | Purple | 48 |
| 63 | Phthalaldehyde | 100 | Acid Green 1 | 0.1 | White | Green | 99 |
| 64 | 4-Nitrobenz-aldehyde | 100 | 4,10-Dibromo-anthanthrone | 1 | White | Red | 105 |
| 65 | Stearone | 100 | Sulfur Black 1 | 0.01 | White | Black | 89 |
| 66 | Docosan-2-one | 100 | Basic Red 38 | 1 | White | Red | 64 |
| 67 | Phenyl heptadecyl ketone | 100 | Pigment Green 8 | 50 | White | Green | 59 |
| 68 | Cyclonona- | 100 | Azoic Blue 9 | 1 | White | Blue | 72 |

TABLE 3-continued (Examples 61 to 90)

| Ex. | Heat-fusible Substance | Amount | Dyestuff | Amount | Before heating | After re-solid-ification | Indicating Point (° C.) |
|---|---|---|---|---|---|---|---|
| | decane | | | | | | |
| 69 | Vinyl heptadecyl ketone | 100 | Reactive Blue 15 | 1 | White | Blue | 41 |
| 70 | 4,4-Bisdimethyl-aminobenzo-phenone | 100 | Pigment Red 209 | 50 | White | Red | 170 |
| 71 | Bis(2,4-pentane-dionite) calcium | 100 | Cochineal lake | 10 | White | Red | 290 |
| 72 | 1-Chloro-anthraquinone | 100 | Sulfur Black 1 | 0.01 | White | Black | 210 |
| 73 | Tricosylamine | 100 | Acid Yellow 73 | 0.001 | White | Yellow | 63 |
| 74 | Dioctadecyl-amine | 100 | Pigment Red 88 | 50 | White | Red | 72 |
| 75 | N,N-Dimethyl-octylamine | 100 | Direct Orange 39 | 0.1 | White | Orange | 191 |
| 76 | Heptadeca-methyleneimine | 100 | Pigment Yellow 23-Lake | 50 | White | Yellow | 65 |
| 77 | Naphthyl-Amine | 100 | Pigment Violet 23 | 10 | White | Purple | 113 |
| 78 | Ethyl p-amino-Benzoate | 100 | Tannic acid-Gallic acid-Iron lake | 1 | White | Black | 90 |
| 79 | o-Trithiourea | 100 | Pigment Blue 15 | 50 | White | Blue | 160 |
| 80 | Sulfamethazine | 100 | Pigment Red 53 | 50 | White | Red | 195 |
| 81 | Guanidine nitrate | 100 | Solvent Orange 2 | 0.01 | White | Orange | 200 |
| 82 | p-Chloroaniline | 100 | Flavianic Acid Disodium Salt | 100 | White | Yellow | 71 |
| 83 | Propylamine hydrochloride | 100 | Acid Yellow 73 | 0.01 | White | Yellow | 161 |
| 84 | Hexylamide | 100 | Acid Red 52 | 0.01 | White | Red | 101 |
| 85 | Octacosyl-Amide | 100 | Acid Yellow 73 | 0.01 | White | Yellow | 119 |
| 86 | N-Methyl dodecylamide | 100 | Acid Violet 49 | 0.1 | White | Purple | 56 |
| 87 | N-Methyl heptacosyl-Amide | 100 | Basic Yellow 11 | 0.1 | White | Yellow | 98 |
| 88 | α-Cyanoacet-amide | 100 | Discharge Red BB | 0.01 | White | Red | 120 |
| 89 | Salicylamide | 100 | Carbon Black | 10 | White | Black | 140 |
| 90 | Dicyandiamide | 100 | Pigment Yellow 23-Lake | 50 | White | Yellow | 200 |

TABLE 4

(Examples 91 to 121)

| Ex. | Heat-fusible Substance | Amount | Dyestuff | Amount | Before heating | After re-solid-ification | Indicating Point (° C.) |
|---|---|---|---|---|---|---|---|
| 91 | 2-Nitrobenz-amide | 100 | Pigment Blue 15 | 50 | White | Blue | 175 |
| 92 | N-Bromo-acetamide | 100 | Pigment Yellow 34 | 50 | White | Yellow | 105 |
| 93 | Pentadecane-nitrile | 100 | Azoic Diazo Compon-ent 11 | 0.1 | White | Red | 23 |
| 94 | Margaronitrile | 100 | Sulfur Black 1 | 0.01 | White | Black | 34 |
| 95 | 2-Naphtho-nitrile | 100 | Pigment Violet 23 | 10 | White | Purple | 63 |

TABLE 4-continued (Examples 91 to 121)

| Ex. | Heat-fusible Substance | Amount | Dyestuff | Amount | Before heating | After re-solid-ification | Indicating Point (° C.) |
|---|---|---|---|---|---|---|---|
| 96 | o-Nitrophenoxy-acetic acid | 100 | Reactive Blue 19 | 1 | White | Blue | 155 |
| 97 | 3-Bromo-benzonitrile | 100 | Aluminum hydroxide | 10 | Yellow | White | 39 |
| 98 | 3-Cyanopyridine | 100 | Acid Green 1 | 0.1 | White | Green | 83 |
| 99 | 4-Cyano-phenol | 100 | Vat Green 9 | 0.1 | White | Green | 112 |
| 100 | Hexadecane | 100 | Basic Red 38 | 1 | White | Red | 18 |
| 101 | 1-Nonatri-acontene | 100 | Disperse Blue 3 | 1 | White | Blue | 78 |
| 102 | trans-n-2-Octadecene | 100 | Vat Green 9 | 0.1 | White | Green | 13 |
| 103 | Hexatriacontyl-benzene | 100 | Pigment Red 38 | 50 | White | Red | 80 |
| 104 | 2-Methyl-naphthalene | 100 | Alizarin Lake | 10 | White | Red | 35 |
| 105 | Picene | 100 | Solvent Blue 25 | 1 | White | Blue | 368 |
| 106 | Cyanuric chloride | 100 | Pigment Yellow 35 | 50 | White | Yellow | 147 |
| 107 | 1-Fluoro-nonadecane | 100 | 4,10-Dibromo-anthanthrone | 1 | White | Red | 39 |
| 108 | 1-Chloro-eicosane | 100 | Remazol Brilliant Blue R-KN | 0.1 | White | Blue | 38 |
| 109 | 1-Iodo-pentadecane | 100 | Strontium sulfate | 10 | Yellow | White | 24 |
| 110 | 1-Bromo-heptadecane | 100 | Direct Orange 39 | 0.1 | White | Orange | 30 |
| 111 | 1,2,4,5-Tetrakis-(bromomethyl)-benzene | 100 | Solvent Orange 2 | 0.01 | White | Orange | 160 |
| 112 | Pentadecane thiol | 100 | Primuline Sulfonic Acid | 1 | White | Yellow | 18 |
| 113 | Eicosane thiol | 100 | Kaolin | 10 | Yellow | White | 37 |
| 114 | 2-Naphthalene thiol | 100 | Disperse Blue 3 | 1 | White | Blue | 80 |
| 115 | 2-Mercapto-ethyl ether | 100 | Vat Green 9 | 0.1 | White | Green | 80 |
| 116 | 2-Nitrobenzene sulfenyl chloride | 100 | Prussian Blue | 1 | White | Blue | 75 |
| 117 | 1,3-Diatine | 100 | Pigment Yellow 1 | 100 | White | Yellow | 53 |
| 118 | 2,11-Dithia-[3,3] para-cyclophane | 100 | Titanium dioxide | 50 | Yellow | White | 222 |
| 119 | Bis-(4-hydroxy-3-methylphenyl) sulfide | 100 | Disperse Blue 3 | 1 | White | Blue | 123 |
| 120 | 4,4-Dipyridyl sulfide | 100 | Calcium silicate | 10 | Yellow | White | 65 |
| 121 | 4-Methyl-mercapto-phenol | 100 | Remazol Brilliant Blue R-KN | 0.1 | White | Blue | 84 |

The results of the foregoing Examples clearly indicate that the granular or powdery dyestuff is covered with the granular or powdery heat-fusible substance in the irreversible heat-sensitive composition of the present invention and that the composition undergoes a color tone change when heated and the color tone is never returned back to the original one even if the composition is again solidified with cooling. The results shown in Tables 1 to 4 also indicate that a wide variety of irreversible heat-sensitive compositions whose indicating point ranges from 13 to 368° C. can be prepared by various combining heat-fusible substances and dyestuffs. This clearly indicates that the temperature at which the composition undergoes a color tone change may arbitrarily be selected over a wide range extending from a low temperature to a high temperature, or the color tone change-temperature can be well systematized.

Comparative Examples 1 to 6

In these Comparative Examples 1 to 6, irreversible heat-sensitive compositions were prepared by repeating the same procedures used in Example 1 except for the following points. The heat-fusible substance of each composition thus prepared was heated till it was fused and thereafter the fused composition was cooled till it was re-solidified to thus confirm the color tone of the composition. The kinds and amounts (part by weight), color tone before and after the color change and the indicating temperature of the heat-fusible substances and dyestuffs are summarized in the following Table 5.

Comparative Ex. 1: The amount of the dyestuff was changed to 0.0001 part by weight.

Comparative Ex. 2: The amount of the dyestuff was changed to 200 parts by weight.

Comparative Ex. 3: The heat-fusible substance was pulverized by a mortar and a pestle to such an extent that the particle size thereof was less than 0.01 μm.

Comparative Ex. 4: The heat-fusible substance was pulverized by a mortar and a pestle to such an extent that the particle size thereof was greater than 5 mm.

Comparative Ex. 5: The dyestuff was pulverized by a mortar and a pestle to such an extent that the particle size thereof was less than 0.001 μm.

Comparative Ex. 6: The dyestuff was pulverized by a mortar and a pestle to such an extent that the particle size thereof was greater than 5 mm.

around the melting point of the heat-fusible substance, if either of the foregoing requirements is beyond the scope defined above.

Then heat-sensitive indicators were manufactured by way of trial using the heat-sensitive ink according to the present invention in the following Examples 122 to 127, and heat-sensitive indicators were likewise manufactured by way of trial using heat-sensitive inks, which were beyond the scope of the present invention, in Comparative Examples 7 to 9.

Example 122

A heat-fusible substance, a dyestuff, an ink vehicle and a solvent were admixed together in the amounts specified in the following Table 6, followed by uniformly kneading the resulting mixture to give a heat-sensitive ink. The resulting ink was printed on the surface of synthetic paper of a plastic, which is a substrate, by the screen-printing technique to give a heat-sensitive indicator.

TABLE 5

(Comparative Examples 1 to 6)

| Comp. Ex. | Heat-fusible Substance | Amount | Dyestuff | Amount | Before heating | After re-solid-ification | Indicating Point (° C.) |
|---|---|---|---|---|---|---|---|
| 1 | Myristic acid | 100 | Acid Yellow 73 | 0.0001 | White | White | 50 |
| 2 | Myristic acid | 100 | Acid Yellow 73 | 200 | Yellow | Yellow | 50 |
| 3 | Myristic acid | 100 | Acid Yellow 73 | 0.1 | White | White | 50 |
| 4 | Myristic acid | 100 | Acid Yellow 73 | 0.1 | Yellow | Yellow | 50 |
| 5 | Myristic acid | 100 | Acid Yellow 73 | 0.1 | White | White | 50 |
| 6 | Myristic acid | 100 | Acid Yellow 73 | 0.1 | Yellow | Yellow | 50 |

The results of the foregoing Comparative Examples 1 to 6 clearly indicate that the achievement of an intended object of the present invention or the preparation of the irreversible heat-sensitive composition can simply be attained if the following requirements are satisfied: the amount of the dyestuff should fall within the range of from 0.001 to 100 parts by weight per 100 parts by weight of the heat-fusible substance; the particle size of the heat-fusible substance should be limited to the range of from 0.01 μm to 5 mm; and that of the dyestuff should be limited to the range of from 0.001 μm to 5 mm. In other words, a particular heat-sensitive composition never undergoes any color tone change at Examples 123 to 127 and Comparative Examples 7 to 9

The same procedures used in Example 122 were repeated except that the heat-fusible substance, dyestuff, ink vehicle and solvent were used in the amounts specified in Table 6 to give each corresponding heat-sensitive indicator.

The indicators manufactured in Examples 122 to 127 and Comparative Examples 7 to 9 by way of trial were heated in a thermostatic chamber to thus determine the temperature at which each indicator underwent a color tone change. The results thus obtained are listed in Table 6.

TABLE 6

| | Heat-fusible Substance | Dye-stuff | Ink vehicle | Solvent | Color tone | | Temp.* (° C.) |
|---|---|---|---|---|---|---|---|
| | | | | | Before heating | After heating | |
| Examples | | | | | | | |
| 122 | Myristic acid (100) | Acid Yellow 73 (0.1) | Ethyl cellulose (8) | Diethyl benzene (200) | White | Yellow | 50 |
| 123 | Stearic acid amide (100) | Basic Red 38 (1) | Acrylic resins (7) | Isoamyl acetate (200) | White | Red | 90 |

TABLE 6-continued

| | Heat-fusible Substance | Dye-stuff | Ink vehicle | Solvent | Color tone Before heating | Color tone After heating | Temp.* (° C.) |
|---|---|---|---|---|---|---|---|
| 124 | β-Eleostearyl alcohol (100) | Cathilon Red SGLH (0.01) | PAS800 medium (50) | Butyl cellosolve (50) | White | Red | 59 |
| 125 | Salicylamide (100) | Carbon Black (10) | High Set Mat Medium (60) | Mineral spirit (50) | White | Black | 140 |
| 126 | Cyclo-nonadecane (100) | Azoic Blue 9 (1) | Ethyl cellulose (8) | Diethyl benzene (200) | White | Blue | 72 |
| 127 | 1,2,4,5-Tetrakis (bromomethyl) benzene (100) | Solvent Orange 2 (0.01) | Hydroxy-m ethyl cellulose (8) | Water (150) | White | Orange | 160 |
| Comparative Examples | | | | | | | |
| 7 | Myristic acid (100) | Acid Yellow 73 (0.1) | High Set Mat Medium (60) | Mineral spirit (50) | Yellow | Yellow | — |
| 8 | Stearic acid amide (100) | Basic Red 38 (1) | Hydroxy-m ethyl cellulose (8) | Water (150) | Red | Red | — |
| 9 | Myristic acid (10) | Acid Yellow 73 (0.1) | High Set Mat Medium (60) | Mineral spirit (50) | White | White | — |

Parts by weight shown in brackets ( )
*: Color changing temperature

As will be seen from the data shown in Table 6, the indicators of Examples 122 to 127 cause distinct color changes at predetermined temperatures and can indicate that they experience desired temperature histories. Moreover, if the indicators were preserved after the color tone changes, the color tones observed after the color changes were certainly maintained. On the other hand, the indicators of Comparative Examples 7 and 8 were already pigmented at the time of the manufacture of the same by way of trial since the heat-fusible substance and the dyestuff had been dissolved in the solvent when kneaded and therefore, the color tone of the indicators observed when they were manufactured by way of trial was maintained even after the fusion of the heat-fusible substance. Further, the indicator of Comparative Example 9 never underwent any color change and thus the original color tone thereof was maintained even after the fusion of the heat-fusible substance, because the amount of the heat-fusible substance incorporated into the indicator was too small.

Moreover, in the following Examples 128 to 133, heat-sensitive indicators were prepared using heat-sensitive inks according to other embodiments of the present invention, while in the following Comparative Examples 10 to 11, indicators were prepared using inks, which were beyond the scope of the present invention.

Example 128

Microcapsules used in these Examples were prepared according to the interfacial polymerization technique.

First, there were mixed 7 parts by weight of a mixture containing 99.9% of myristic acid as a heat-fusible substance and 0.1% of Acid Yellow 73 as a dyestuff with 30 parts by weight of Epicoat 828 (the trade name of a product available from Yuka Shell Epoxy K.K.) as an epoxy resin for forming the outer walls of the microcapsules. The resulting mixture was dispersed in a dispersion medium obtained by admixing 500 parts by weight of a 2% aqueous solution of sodium alginate and 3 parts by weight of Uramine P-1500 (the trade name of a product available from Mitsui Toatsu Chemicals, Inc.) as a urea resin, followed by stirring the mixture over 20 minutes to give an emulsion.

Thereafter, 30 parts by weight of Epicure (the trade name of a product available from Yuka Shell Epoxy K.K.) as a curing agent was added to the resulting emulsion, followed by stirring the mixture for 8 hours to thus form the walls of the microcapsules.

The resulting liquid was filtered to give microcapsules each of which enclosed the heat-fusible substance and the dyestuff therein.

Then there were kneaded, in a kneader, 100 parts by weight of the resulting microcapsules, 50 parts by weight of PAS800 Medium as an ink vehicle and 50 parts by weight of butyl cellosolve as a solvent for the ink vehicle to give a heat-sensitive ink. The surface of synthetic paper of a plastic, which is a substrate, was printed with this ink by the screen-printing technique to give a heat-sensitive indicator.

Examples 129 to 133 and Comparative Example 10

Microcapsules were prepared using polymeric compounds, heat-fusible substances and dyestuffs in amounts specified in the following Table 7 according to various preparation methods. In this respect, the following methods were substituted for the interfacial polymerization method used in Example 128: the phase separation method in Examples 129 and 131 to 133; the drying-in liquid method in Example 130; and the interfacial polymerization method in Comparative Example 10 as in Example 128. Thereafter, the same procedures used in Example 128 were repeated to prepare inks and to manufacture indicators.

Comparative Example 11

There were kneaded, in a kneader, 100 parts by weight of myristic acid, 0.1 part by weight of Acid Yellow 73, 50 parts by weight of PAS800 Medium, and 50 parts by weight of butyl cellulose to give an ink without enclosing the mixture in microcapsules. An indicator was prepared by printing a substrate with the resulting ink according to the same manner used in Example 128.

tion can be used in printing operations irrespective of the shape thereof. For instance, a printing ink can be prepared using an appropriate vehicle prior to practical use thereof in printing. In addition, the composition of the present invention permits the use of a wide variety of dyestuffs unlike Blending of heat-sensitive ink

| | Microcapsule | | | Ink vehicle | | Solvent for ink vehicle | | Heat-sensitive indicator Color tone | | |
|---|---|---|---|---|---|---|---|---|---|---|
| | Polymeric compounds forming outer wall | Comprised heat-fusible substance | Mixing amount | | Mixing amount | | Mixing amount | Before heating | After heating | Temp.* (° C.) |
| Examples | | | | | | | | | | |
| 128 | Epoxy resins | Myristic acid:Acid Yellow73 (99.9%:0.1%) | 100 | PAS800 medium | 50 | Butyl cellosolve | 50 | White | Yellow | 50 |
| 129 | Polystyrene | Stearic acid amide: Basic Red38 (99%:1%) | 100 | High Set Mat Medium | 60 | Mineral spirit | 50 | White | Red | 90 |
| 130 | Silicone resins | β-Eleostearyl alcohol: Cathilon Red SGLH (99.99%:0.01%) | 100 | Aqua Set Ink | 100 | Water | 20 | White | Red | 59 |
| 131 | Polystyrene | Salicylamide Carbon Black (89.9%:10.1%) | 100 | VAR-000 Medium | 70 | Ethanol | 30 | White | Black | 140 |
| 132 | Polyvinyl acetate | Cyclononadecane: Azoic Blue 9 (99%:1%) | 100 | Ramistar R Medium | 100 | Isopropyl alcohol | 50 | White | Blue | 72 |
| 133 | Gelatin | 1,2,4,5-Tetrakis (bromomethyl) benzene: Solvent Orange 2 (99.99%:0.01%) | 100 | Ethyl cellulose | 8 | Diethyl benzene | 200 | White | Orange | 160 |
| Comparative Examples | | | | | | | | | | |
| 10 | Epoxy resins | Myristic acid:Acid Yellow 73 (99.9%:0.1%) | 10 | PAS800 medium | 50 | Butyl cellosolve | 30 | White | White | — |
| 11 | None | Myristic acid:Acid Yellow 73 (100:0.1 parts by weight) | 100.1 | PAS800 medium | 50 | Butyl cellosolve | 50 | Yellow | Yellow | — |

*: Color changing temperature

The indicators prepared in Examples 128 to 133 and Comparative Examples 10 to 11 were heated in a thermostatic chamber to thus determine the temperature at which each indicator underwent a color tone change. The results thus obtained are summarized in Table 7.

As will be seen from the data listed in Table 7, the heat-sensitive indicators of Examples 128 to 133 undergo distinct color changes at desired temperatures and could indicate that they experienced the desired temperature histories. Moreover, the heat-sensitive indicators were preserved after the color tone changes, but maintained the color tones observed after the color changes and there was not observed any color tone change. On the other hand, the indicator of Comparative Example 10 maintained its original color tone even after the heat-fusible substance was fused with heating since the amount of the microcapsules incorporated is too small. Further, in case of the indicator of Comparative Example 11, the heat-fusible substance and the dyestuff were dissolved in the solvent when they were kneaded together with the latter and the resulting ink was pigmented at this stage. For this reason, the indicator maintained the color tone observed after the pigmentation even when heating the same.

Regarding all of the dyestuffs listed in Table 7, "C.I." of each dyestuff is omitted.

As has been discussed above in detail, the irreversible heat-sensitive composition according to the present invention can be used in printing operations irrespective of the shape thereof. For instance, a printing ink can be prepared using an appropriate vehicle prior to practical use thereof in printing. In addition, the composition of the present invention permits the use of a wide variety of dyestuffs unlike those, which make use of chemical decomposition or chemical reactions of dyestuffs. This composition also permits the establishment of a variety of color change temperatures extending from a low temperature to a high temperature, by variously combining different heat-fusible substances and dyestuffs. This accordingly permits the systematization of the color change temperatures of such irreversible heat-sensitive compositions.

Heat-sensitive indicator can be mass-produced by the printing operations if using the heat-sensitive ink according to the present invention and this accordingly leads to the substantial reduction of the cost required for the production of such indicators.

The heat-sensitive indicator prepared by printing operations using this heat-sensitive ink undergoes an irreversible color tone change and can be preserved while maintaining the color tone observed after the color change.

Moreover, if microcapsules are used in the heat-sensitive ink, the heat-fusible substance and the dyestuff encapsulated in the microcapsules show excellent stability and resistance to environment in the ink. In addition, when preparing an ink, vehicles or solvents for the vehicles to be incorporated into the ink must not be limited to those in which the heat-fusible substance and dyestuff are insoluble and the resulting ink is excellent in the printing characteristics and the preservation stability after printing.

The heat-sensitive indicator of the invention can favorably be used for the confirmation of whether a product such as a processed food product requiring desired temperature control is certainly heated to a temperature of not less than a predetermined level in the heating step of the product; and of whether a product, which must not be heated to a predetermined temperature level, such as a medical product including a drug, a food product or an electric part is not heated to such a temperature level or not during distribution, storage and/or use thereof.

What is claimed is:

1. An irreversible heat-sensitive composition comprising a mixture of a granular or powdery heat-fusible substance having a melting point corresponding to a temperature to be recorded and a granular or powdery dyestuff diffusible into the fused heat-fusible substance, said heat-fusible substance being at least one member selected from the group consisting of fatty acid derivatives, alcohol derivatives, ether derivatives, aldehyde derivatives, ketone derivatives, amine derivatives, amide derivatives, nitrile derivatives, hydrocarbon derivatives, thiol derivatives and sulfide derivatives, through dispersion or dissolution.

2. The irreversible heat-sensitive composition as set forth in claim 1, wherein the amount of the dyestuff ranges from 0.001 to 100 parts by weight per 100 parts by weight of the heat-fusible substance.

3. The irreversible heat-sensitive composition as set forth in claim 1, wherein the heat-fusible substance has a particle size ranging from 0.01 µm to 5 mm.

4. The irreversible heat-sensitive composition as set forth in claim 1, wherein the dyestuff has a particle size ranging from 0.001 µm to 5 mm.

5. A heat-sensitive ink comprising an irreversible heat-sensitive composition, which comprises a mixture of a granular or powdery heat-fusible substance having a melting point corresponding to a temperature to be recorded and a granular or powdery dyestuff diffusible into the fused heat-fusible substance, said heat-fusible substance being at least one member selected from the group consisting of fatty acid derivatives, alcohol derivatives, ether derivatives, aldehyde derivatives, ketone derivatives, amine derivatives, amide derivatives, nitrile derivatives, hydrocarbon derivatives, thiol derivatives and sulfide derivatives, through dispersion or dissolution; and an ink vehicle capable of diffusing the fused heat-fusible substance therein.

6. The heat-sensitive ink as set forth in claim 5, wherein the ink vehicle is a member selected from the group consisting of acrylic resins, phenol resins, nylons, ethyl cellulose, hydroxymethyl cellulose, polyvinyl alcohol and carboxymethyl cellulose.

7. The heat-sensitive ink as set forth in claim 5, wherein it comprises the heat-fusible substance in an amount ranging from 10 to 70% by weight.

8. A heat-sensitive ink comprising microcapsules, which encapsulate an irreversible heat-sensitive composition comprising a mixture of a granular or powdery heat-fusible substance having a melting point corresponding to a temperature to be recorded and a granular or powdery dyestuff diffusible into the fused heat-fusible substance through dispersion or dissolution, and an ink vehicle capable of diffusing the fused heat-fusible substance therein.

9. The heat-sensitive ink as set forth in claim 8, wherein the outer wall of the microcapsule is formed from a polymeric compound selected from the group consisting of polyvinyl alcohol, polystyrene, silicone resins, epoxy resins, acrylic resins, urea resins, gelatin, methyl cellulose, polyurethane, waxes, gum arabic, dextrin and nylon.

10. The heat-sensitive ink as set forth in claim 8, wherein it comprises the microcapsule in an amount ranging from 10 to 70% by weight.

11. A heat-sensitive indicator comprising a substrate provided thereon with a printed heat-sensitive ink layer, wherein the heat-sensitive ink comprises an irreversible heat-sensitive composition, which comprises a mixture of a granular or powdery heat-fusible substance having a melting point corresponding to a temperature to be recorded and a granular or powdery dyestuff diffusible into the fused heat-fusible substance, said heat-fusible substance being at least one member selected from the group consisting of fatty acid derivatives, alcohol derivatives, ether derivatives, aldehyde derivatives, ketone derivatives, amine derivatives, amide derivatives, nitrile derivatives, hydrocarbon derivatives, thiol derivatives and sulfide derivatives, through dispersion or dissolution, and an ink vehicle capable of diffusing the fused heat-fusible substance therein.

12. A heat-sensitive indicator comprising a substrate provided thereon with a printed heat-sensitive ink layer, wherein the heat-sensitive ink comprises microcapsules, which encapsulate an irreversible heat-sensitive composition comprising a mixture of a granular or powdery heat-fusible substance having a melting point corresponding to a temperature to be recorded and a granular or powdery dyestuff diffusible into the fused heat-fusible substance through dispersion or dissolution, and an ink vehicle capable of diffusing the fused heat-fusible substance thereto.

* * * * *